Patented July 12, 1932

1,866,633

UNITED STATES PATENT OFFICE

ALFRED EHRENREICH, OF LONDON, ENGLAND

METHOD OF TREATMENT OF THE GLANDS OF THE PLAGIOSTOMI

No Drawing. Application filed January 24, 1928, Serial No. 249,207, and in Belgium February 3, 1927.

The present invention relates to a method of treatment of the glands of the plagiostomi such as, and in particular, the shark, with a view to obtaining a new kind of chemical product capable of various uses in industry, examples of which will be given below, the said products offering the advantage of being simple and inexpensive to prepare and of being obtainable from abundant raw material, the cost being, for these two reasons, extremely low.

The glands of the plagiostomi to the treatment of which the invention relates are, inter alia, and in particular those situated under the esophagus, the first intestinal gland which is found at the point where the stomach joins the intestine, the genital glands of the male fish and also the ovaries of the female fish, that of the cerebellum situated between the front and rear lobes and those situated above the organs of evacuation.

In accordance with the invention active chemical principles are extracted from these glands with a view to the preparation of various chemical products, the constitution of which chemical principles it has not yet been found possible to determine exactly and which are known under the generic name of enzymes, or ferments.

The extraction of the active matter of the glands may be effected by submitting the glands, after being previously cleaned, to a process for removing the grease by means of an organic solvent such as, for instance, acetone and by drying the residue in vacuo at a temperature of about 50° C. the said residue after drying being then pulverized so that a whitish powder is obtained in such manner.

After being cleaned and having the grease removed, the glands may also be treated with water in such a way as to give an aqueous extract, the active matter being precipitated from this extract by tannin, filtered and afterwards dried, giving a whitish powder.

In certain cases it is preferable to dry in vacuo at a temperature of about 50° C. the aqueous extract from the glands after removal of the grease and it is of advantage in order to facilitate the drying and to husband the active matter, to cause the aqueous extract to be absorbed by porous substances such as infusorial earth or kieselguhr, wood sawdust and the like for drying purposes.

With regard more particularly to the treatment of the gland situated at the point of junction of the stomach with the intestine of the plagiostomi, which appears to correspond with the pancreas of the terrestrial mammifera, tests have shown that the method of action and the constitution of the enzymes which it contains differ considerably from those of the enzymes of the pancreas, in view of the fact that the glands of the plagiostomi contain principally enzymes of the nature of trypsin, as well as lipases, but do not contain any amylases; the active substances containing these ferments may be obtained by any one of the above processes and also, according to the case, by treating the glands, the grease of which has been removed by means of acetone or other organic solvents, by means of chloroform, the extract obtained being then treated with ether and the precipitate produced being dried in vacuo at a low temperature and yielding a whitish powder.

Moreover, as regards in particular the glands situated above the organs of evacuation it is possible to isolate the active matter by treating the glands after elimination of the grease and bruising by means of acidified absolute alcohol and by reducing the liquid obtained in vacuo, the active matter being then precipitated preferably without exposure to air (in view of the facility with which it oxidizes) by means of alkalis or alkaline reaction bodies, for instance with ammonia; it is then filtered also without exposure to air, the precipitate on being washed with a mixture of alcohol and ether giving a crystalline powder of a yellowish white colour not very soluble in pure water, but very soluble in acidulated water.

This new description of chemical products obtained by treating the glands of the plagiostomi is capable of being put to many uses in industry. For instance, in the leather industry, the skins may, before being tanned, be treated by one of these products, in particular that furnished by the intestinal gland, this treatment making the subsequent tanning more active and more efficacious owing to the fact that the enzymes decomposing the albumen and the greases, destroy the inter-cellular substances and consequently render the texture of the skins treated much looser thus facilitating the penetration of the tanning agent.

Moreover, in the ungumming of silk, the grit or sericine which is generally eliminated in baths of soap and soda salts may be removed to advantage, either completely or partially, without the aid of any soap or salt by means of extracts from the glands of plagiostomi. It is also possible in certain cases to utilize these chemical products for the preparation of certain medicaments, in particular to obtain an increase in the blood pressure, the contraction of certain organs, for anaetheses, etc.

It is quite understood that it is possible without departing from the invention, to apply variations and improvements in details.

What I claim is:

1. A method of treatment of the glands of the plagiostomi of the shark type for extracting enzymes, and ferments, comprising first the elimination of grease from the glands, and then the extraction of the active matter from the glands.

2. A method of treating the gland situated under the œsophagus and the gland situated at the point of junction of the stomach with the intestine; which method consists in first cleaning and removing the grease from the gland, then extracting the enzymes from the gland by water thus forming an aqueous extract, then precipitating the enzymes from the extract by the use of tannin and finally filtering and drying the product.

In testimony whereof I affix my signature.

ALFRED EHRENREICH.